(12) United States Patent
Bosnyak et al.

(10) Patent No.: US 8,475,961 B2
(45) Date of Patent: Jul. 2, 2013

(54) HIGH PERFORMANCE ENERGY STORAGE AND COLLECTION DEVICES CONTAINING EXFOLIATED MICROTUBULES AND SPATIALLY CONTROLLED ATTACHED NANOSCALE PARTICLES AND LAYERS

(75) Inventors: Clive P. Bosnyak, Dripping Springs, TX (US); Kurt W. Swogger, Austin, TX (US)

(73) Assignee: Molecular Rebar Design, LLC, Austin, TX (US)

( * ) Notice: Subject to any disclaimer, the term of this patent is extended or adjusted under 35 U.S.C. 154(b) by 205 days.

(21) Appl. No.: 12/968,151

(22) Filed: Dec. 14, 2010

(65) Prior Publication Data

US 2011/0151321 A1   Jun. 23, 2011

Related U.S. Application Data

(60) Provisional application No. 61/288,025, filed on Dec. 18, 2009.

(51) Int. Cl.
*H01M 4/13* (2010.01)

(52) U.S. Cl.
USPC ............. 429/231.8; 429/209; 429/218.1; 977/734; 977/742; 977/745; 977/748; 977/948

(58) Field of Classification Search
None
See application file for complete search history.

(56) References Cited

U.S. PATENT DOCUMENTS

| | | |
|---|---|---|
| 3,415,920 A | 12/1968 | Lee et al. |
| 5,094,793 A | 3/1992 | Schrenk et al. |
| 6,114,068 A * | 9/2000 | Yamada et al. ............ 429/300 |
| 7,060,390 B2 | 6/2006 | Chen et al. |
| 2005/0006623 A1 * | 1/2005 | Wong et al. .................. 252/70 |
| 2006/0286456 A1 | 12/2006 | Fu et al. |
| 2007/0048619 A1 * | 3/2007 | Inda ............................ 429/322 |
| 2008/0280207 A1 | 11/2008 | Patoux et al. |
| 2011/0039157 A1 | 2/2011 | Tatsuro et al. |

FOREIGN PATENT DOCUMENTS

WO   2010117392 A1   10/2010

OTHER PUBLICATIONS

European Patent Office, International Search Report and Written Opinion, PCT Application No. PCT/US2010/060349, May 30, 2011.
European Patent Office, Response to Office Action, European Patent Application No. 10812970.1, Feb. 13, 2013.

\* cited by examiner

*Primary Examiner* — Cynthia Walls
(74) *Attorney, Agent, or Firm* — Jackson Walker L.L.P.

(57) ABSTRACT

The present disclosure relates to energy storage or collection devices and methods for making such devices having electrode materials containing exfoliated nanotubes with attached electro- or photoactive nanoscale particles or layers.

The exfoliated nanotubes and attached nanoscale particles or layers may be easily fabricated by methods such as coating, solution or casting or melt extrusion to form electrodes. Electrolytes may also be used for dispersing nanotubes and also in a polymeric form to allow melt fabrication methods.

27 Claims, No Drawings

HIGH PERFORMANCE ENERGY STORAGE AND COLLECTION DEVICES CONTAINING EXFOLIATED MICROTUBULES AND SPATIALLY CONTROLLED ATTACHED NANOSCALE PARTICLES AND LAYERS

RELATED APPLICATION INFORMATION

This application claims priority to U.S. Provisional patent application Ser. No. 61/288,025 filed Dec. 18, 2009, the disclosure of which is incorporated herein in its entirety.

FIELD OF THE INVENTION

This disclosure relates generally to improved energy storage or collection devices and particularly to batteries, ultracapacitors and photovoltaics utilizing components containing microtubules that have been exfoliated and have attached nanoscale particles or layers.

BACKGROUND OF THE INVENTION

Carbon nanotubes (CNTs) are considered attractive materials for use in energy storage devices because of the individual nanotube properties of high strength and electrical conductivity. Carbon nanotubes have been recognized to be potentially useful in lithium ion batteries because of the lithium ion intercalation with the graphene layers, as described in U.S. Pat. No. 7,060,390. The challenge with current widespread use of carbon nanotubes, particularly with single walled and doubled walled carbon nanotubes is the absence of a robust, efficient and innocuous method to completely debundle nanotube aggregates into an individually dispersed state (i.e., exfoliated state). Thus, the previous use of carbon nanotubes in energy storage devices have been limited in performance by not being able to fully access the active surface area. Likewise the CNTs are difficult to obtain of high purity (>about 96 percent by weight) through removal of their catalytic residues and non-tubular carbon structures arising from their synthesis.

The obstacle to exfoliating CNTs arises because immediately following their synthesis the tubes readily assemble into parallel configurations leading to what is commonly referred to as bundles or ropes. As a consequence formidable van der Waals binding energies of about 20 kbT for every nanometer of tube overlap result, and hence, formation of aggregates that are very difficult to separate completely occurs. To overcome the van der Waals forces various approaches have been employed, such as tube chemical functionalization, surfactants and the like. These approaches have only been successful at producing exfoliated nanotubes of higher yields after severe degradation of the initial tube length. Carbon nanotubes of much reduced length suffer from poorer strength and conductance and thus limit their full performance in energy storage or collection devices.

Aligned carbon nanotubes still have considerable van der Waals associations which cause local clumping of the carbon nanotubes and hence reduced active surface area. Also, the challenge with aligned carbon nanotubes composites is that cracking in the tube direction can occur more easily than randomly oriented carbon nanotube composites. Additionally, the cost associated with specialty techniques for growing the carbon nanotubes in vertical arrays and their handling in making commercial electrodes is thought to be prohibitively high.

Lithium, Li, ion batteries are receiving considerable attention in applications, ranging from portable electronics to electric vehicles, due to their superior energy density over other rechargeable battery technologies. However, demands for lighter, thinner, and higher capacity lithium ion batteries has necessitated a concerted development of both improved electrodes and electrolytes to extend battery capacity, cycle life, and charge-discharge rates while maintaining the highest degree of safety available.

Li-ion batteries for vehicles typically require three times higher energy densities than available at present to meet the volume/weight requirements and to reduce the number of cells in the battery and system cost. Li batteries are not intrinsically tolerant to abusive conditions such as a short circuit (including an internal short circuit), overcharge, over-discharge, crush, or exposure to fire and/or other high temperature environments. The use of Li chemistry in these larger (energy) batteries increases the urgency to address these issues. The ability to attain a 15 year life, or 300,000 HEV cycles, or 5,000 EV cycles are unproven in conventional Li ion batteries and are anticipated to be difficult due to undesirable volume expansions/failure at electrodes and side-reactions of Li with the electrolyte at voltages greater than about four volts.

Batteries generally include a cathode, an anode and an electrolyte. Commercially, the most popular material for the anode of a Li-ion battery is graphite. The cathode is generally one of three materials: a layered oxide, such as lithium cobalt oxide, one based on a polyanion, such as lithium iron phosphate, or a spinel, such as lithium manganese oxide. The common lithium ion battery as commercialized by Sony uses an inorganic compound, $LiCoO_2$ as the cathode material and graphite at the anode. The $LiCoO_2$ has a rhombohedral structure where Li and Co cations fill alternating layers of edge-sharing octahedral sites in a close packed oxygen array. During charging, lithium is de-intercalated from the cathode layers, transported across the separator membrane in an electrolyte medium, and then intercalated into the carbon anode. In the discharge process, the lithium ions are de-intercalated from the anode and intercalated again to the empty octahedral site between layers in the cathode. Depending on the choice of material for the anode, cathode, and electrolyte the voltage, capacity, life, and safety of a lithium ion battery can change dramatically. A challenge for batteries in general is to manage the heat generated at the anode during discharge. The heat causes degradation of the electrolyte and hence reduced energy capacity over time.

The specific energy density (per weight or per volume) is related to both the working voltage and the reversible capacity. The working voltage depends on the potential of the redox process and the reversible capacity is restricted by the reversible amount of lithium intercalation. The available redox pair should locate in a higher and suitable potential range and the structure of material should be stable in wide composition range in order to obtain a high capacity.

The electrochemical lithium insertion/extraction reactions involve both lithium Ions diffusion in the lattice and charge transfer process on the particle surface. Thus, the electrode's conductivity includes lithium ion conductivity in active material bulk and electronic conductivity of electrode. Higher electronic conductivity is helpful to keep the inner resistance low and gives an excellent power density. Routes to overcome this deficiency include reduction of particle size and increase in electronic conductivity by coating of conducting agent such as carbon, as described in WO 2009/133807.

Silicon nanowires would appear to have high potential for future battery applications because of their inherent storage capacity of 4200 mAh $g^{-1}$. However, silicon expands over 300% upon $Li^+$ insertion, leading to severe problems of cracking on charge/discharge cycling. US 2008/0280207 describes an anode structure consisting of a silicon layer (not nanowires) around a parallel array of carbon nanotubes as being beneficial for improved capacity. The silicon layer is deposited by using chemical vapor deposition of $SiH_4$. The carbon nanotubes are also not exfoliated.

Conducting or high dielectric polymers such polyaniline, polypyrrole and polyvinylidene fluoride are often selected for binders of electro active particles.

The most popular electrolytes are the liquid-type ones where carbonates or esters of simple alcohol and glycol are frequently used as solvents which contain $LiPF_6$ as an electrolyte. Solvents typically are a mixed solution of ethylene carbonate (EC) of high dielectric constant and methyl ethyl carbonate (MEC) of low viscosity. Sometimes a combination of $\square$-butyrolactone and $LiBF_4$ is utilized. Propylene carbonate is an excellent solvent, but it decomposes rapidly on the surface of graphite. If there is a short circuit, very significant heat buildup (>200° C.) can occur and ignite these types of electrolytes.

Recently, polymer electrolytes have attracted much attention because they enable freedom from electrolyte leakage and can make a thin battery. Solid-state electrolytes and some polymer electrolytes need no separator. Many kinds of polymer electrolytes have been proposed, but only a few are utilized in practical batteries. Polysiloxane is one of recent interest. Many solid polyelectrolyte types are not a true solid polymer, but a polymer gel containing liquid electrolyte as a plasticizer.

The separator has two primary functions: one is to avoid the direct contact between the anode and cathode, while it allows a free mass transfer of the electrolyte, and the other is a shutter action to stop the mass transfer in the case of accidental heat generation. The separator film melts resulting in pore closure. Biaxially orientated polyolefin film is commonly used to obtain a high porosity film.

A composite anode material made of silicon/graphite/multi-walled carbon nanotubes (MWNTs) for Li-ion batteries has been prepared by ball milling. This composite anode material showed a discharge capacity of 2274 milliamp-hours per gram (mAh/g) in the first cycle, and after 20 charge-discharge cycles, a reversible capacity of 584 mAh/g was retained, higher than 218 mAh/g for silicon/graphite composite. However, the silicon particles appeared to be on a scale of about a micrometer in diameter and were irregularly distributed. Further, no attachment of the particles to the MWNT was apparent.

Vertically-aligned multi-walled carbon nanotube (VAMWNT) electrodes grown on substrates such as aluminum or silicon have been investigated. The current state-of the-art of lithium-ion batteries utilizes graphite as a negative electrode with a maximum theoretical specific capacity of 372 mAh/g and a practical specific capacity ranging from 150-370 mAh/g, which were aligned in the direction of current flow. By aligning the nanotubes in this manner, increased access and interfacial dynamics between lithium-ions and the interstitial spaces of the MWNTs as well as the internal and external surfaces of the MWNTs were thought possible. These electrodes were able to produce a stable and reversible capacity of 650 mAh/g. As mentioned previously, fully aligned carbon nanotubes as made can still associate to form bundles and cracking is more likely along the tube lengths.

Aligned carbon nanotube coaxial nanowires have also been prepared by electrochemically depositing a concentric layer of an appropriate conducting polymer or titanium dioxide, $TiO2$, coating onto the individual aligned carbon nanotubes. These aligned carbon nanotube coaxial nanowires were demonstrated in the laboratory to possess unique electron transfer properties and speculated to have potential significance for a wide range of device applications, including batteries and supercapacitors.

Mats of carbon nanotubes and carbon particles have been utilized as conductive systems to replace metal foils. Impregnation of xerogels of $V_2O_5$ composite electrode gave a reversibility specific capacity of 160 $mAh.g^{-1}$ at a constant discharge/charge current of 95 pk $mA.g^{-1}$ between 4 and 2V versus $Li/Li^+$ Simple impregnation methods do not control the spatial distribution of the particles to prevent local charge density fluctuations and stable structure over time. Control of the distribution of the nanoscale particles or layers by attachment is believed to be beneficial to maintain the high crystal surface area to volume ratio.

SUMMARY OF THE INVENTION

The present disclosure, in some embodiments, relates to improved energy storage or collection devices, and more particularly to a battery, capacitor or photovoltaic that has high energy density, power density, and photon conversion efficiency having at least one of at least two electrodes containing carbon nanotubes or other types of nanotubes from elements or metal complexes that have been exfoliated from their as-synthesized state—meaning as the carbon nanotubes were originally made in the un-exfoliated state, have attached electro-or photo active nanoscale particles or layers and having a dielectric medium or electrolyte.

In another embodiment, the energy storage or collection devices contain nanotubes further associated or functionalized with electro active or photo active species containing transition elements, oxides and complexes of transition metals, such as, but not limited to Ru, Ir, W, Mo, Mn, Ni, Co, Ti, V, Si, Sn, Fe and combinations thereof.

In another embodiment, the energy storage or collection devices contain nanotubes further associated or functionalized with electro active or photoactive species containing and admixed with conducting polymers such as polyaniline or polyvinylpyrrole.

In another embodiment, the energy storage or collection devices contain exfoliated nanotubes that are dispersed using a surfactant that can also serve as an electrolyte salt, such as tetraethyl- or tetrabutylammonium tetrafluoroborate.

In yet another embodiment, the energy storage or collection devices contain nanotubes that have been exfoliated and have attached nanoscale particles or layers wherein the assembly is then oriented.

In another embodiment, the energy storage or collection devices contain nanotubes that have been exfoliated and have attached nanoscale particles or layers and then fabricated in the form of a film, thin mats, fibers, cloths, non-woven fabrics, felts and the like.

In another embodiment, the energy storage or collection devices contain at least two electrodes having at least one of the electrodes containing carbon or mineral nanotubes that have been exfoliated and having attached nanoscale particles or layers; an electrolyte disposed between the electrodes; and a separator disposed in the electrolyte to provide electrical insulation between the electrodes while allowing ion flow within the electrolyte.

In further embodiments, the energy storage or collection devices contain an insulator further having a portion of nanotubes having been exfoliated and having attached nanoscale particles or layers distributed in an insulator medium such that the dielectric constant of the insulator and nanotube mixture is greater than the insulator medium alone.

In another embodiment, methods for making an energy storage or collection device include redispersing the exfoliated nanotubes in a medium such as a polymer or viscous liquid, to create an electrode and laminating with another media to the electrode acting as a dielectric or electrolyte. Formation of the electrode may occur through coextrusion of liquids or melts through multilayer dies or multilayer generators, such as described in U.S. Pat. Nos. 3,415,920 and 5,094,793. The resultant multilayer can be stacked and connected in series to give higher voltage. Alternatively, the energy storage devices can be made with the exfoliated nanotubes by processing the mixture of the exfoliated nanotubes by solvent casting, spraying, paste spreading, compression stretching, or combinations of the like to give the desired form.

In another embodiment, the incorporation of exfoliated nanotubes to the electrode material provides enhanced strength and ruggedness to the electrode, allowing further shaping of the electrode or performance under more demanding environments such as high vibration or extreme thermal cycling. This is compared to an electrode material without exfoliated nanotubes.

DETAILED DESCRIPTION OF THE INVENTION

The present disclosure relates to improved energy storage or collection devices consisting of current collectors, electrodes, insulators, electrolytes or separators comprising exfoliated nanotubes with attached nanoscale particles or layers that are electro- or photoactive.

The nanotubes contain materials such as, but not limited to carbon, silicon, metals or inorganic compounds or mixtures thereof. The nanotubes have a diameter of between about 1 nm and about 20 nm in some embodiments and between about 1 nm and about 10 nm in other embodiments. The nanotubes have an aspect ratio, or length to diameter ratio, of least about 10 in some embodiments and at least about 60 in other embodiments. Carbon nanotubes generally have an inner diameter of about 1.2 nm.

"As-synthesized" carbon nanotubes can be made from any known means such as chemical vapor deposition laser ablation, high pressure carbon monoxide synthesis and the like. Chemical Vapor Deposition (CVD) is the most frequently employed process for the manufacture of carbon nanotubes as well as the process most predominately used by the largest suppliers in the industry. This method utilizes a carbon source in gaseous form (referred to as a precursor) being diluted with an inert gas and inflowing into the reactor. As the precursor interacts with a catalyst on the fixed substrate, the gaseous carbon sources decompose into a solid state to form a mixture of single-, dual-, and multi-walled carbon nanotubes along with other impurities in an agglomerate.

Carbon nanotubes can be oxidized using techniques such as a mixture of concentrated sulfuric acid and nitric acid for lengths of time to give a combination of hydroxyl and carboxylic acid groups on the carbon nanotube surface. These hydroxyl and carboxyl groups can be easily converted to other functional groups such as oxychlorides or fluorides as desired. The carboxyl groups are suitable for attachment of metals, metal oxides or other element-containing complexes.

Exfoliation of nanotubes means that there is no direct association with other nanotubes along substantially the length of the nanotube.

Attachment of nanoscale particles or layers means that the nanoscale particle or layer is held next to the nanotube by at least one electrostatic or covalent bonding site.

EXAMPLE

A solution of lithium hydroxide is added to a deposition of exfoliated carbon nanotubes having carboxylate functionality followed by washing with deionized water and then dried. Presynthesized orthorhombic $LiFePO_4$ nanocrystals (or other cathode material) can be attached to sidewalls of the dispersed carbon nanotubes by association with $LiCO_3$. Alternatively, $LiFePO_4$ nanocrystals can be attached directly to the exfoliated functionalized carbon nanotubes through in-situ synthesis of the inorganic crystal at temperatures 400° C. as carbon nanotubes are known to be stable at these temperatures. $LiFePO_4$ is inherently low in electrical (electronic and ionic) conductivity. By using nanosized particles Li can easily access and exit the crystal galleries thereby increasing Li charge and discharge rates. Using nanoscale crystals also mitigates problems of cracking due to expansion/contraction of the lattice as Li migrates in and out during charging/discharging. Attachment of the nanoscale electroactive species to the carbon nanotube facilitates the electron transfer and prevents local migration of nanoparticles which could lead to inhomogeneous performance.

A binder such as polyvinylidene fluoride can be added, if desired, to the nanotubes that have been exfoliated and have electro-or photoactive materials attachments. The binders can be added as a solution or melt.

Orientation of the exfoliated carbon nanotubes with attachments can be obtained by dispersing the carbon nanotubes and attachments in polymeric media and orienting the tubes by fiber extrusion. The polymeric media could be a binder such as PVDF. Other selected polymeric media could include polyethylene oxide or polyvinyl alcohol that can be incorporated within the electrolyte system or easily removed by heating at 250° C., or by washing with water.

These tubes can be functionalized with a variety of chemical groups such as Al, Ga, In, Au, and Pd, all useful as silicon nanotube catalysts. Silicon nanotubes can be grown in plasma at 400° C. on the catalyst particles on the exfoliated carbon nanotubes.

Substrate-enhanced electroless deposition (SEED) methods can be used for decorating carbon nanotubes with various metal and metal oxide nanoparticles such as Cu, Ag, Sn, Au, Pt, Pd, Zn, and V. Continued deposition of nanoparticles can lead to complete coverage of the nanotube if desired. Alternatively, a technique such as using Fehlings solution can be used to fully coat the exfoliated nanotubes with an oxide. Nanoscale particles of tin oxide, for example, attached to the exfoliated carbon nanotubes is useful as an anode in lithium ion batteries. Likewise, attached nanoscale $TiO_2$ particles to exfoliated carbon nanotubes are useful to provide improved photovoltaic devices.

A general procedure for making attachments of silicon to carbon surfaces (not involving MWNTs) can be found in Stewart et al., J. Am. Chem. Soc, 2004, 126:370-378. In various embodiments, silyl-protected terminal alkyne moieties are placed on the surface of the exfoliated carbon nanotubes in a uniform manner, and then nanoscale particles of silicon are added to provide a uniform distribution of silicon particles on the surface. The surfaces of commercially available silicon nanoparticles can be treated to enable stable particle dispersions in various solvents. The final structures are obtained, for example but not limited to, by combination of exfoliated carbon nanotubes and fully dispersed silicon nanoparticles in an appropriate liquid media followed by the attachment chemistry. These nanoscale particles are 3-20 nm in diameter. The attached silicon particles, tubes or layers are useful for improved anodes for lithium ion batteries as well as solar photovoltaic devices.

Likewise, attachment of silicon-oxycarbide particles to exfoliated carbon nanotubes are useful for cathodes of lithium ion batteries.

We claim:

1. An energy storage and collection device comprising:
   a) at least two electrodes;
   b) at least one of the electrodes containing carbon or mineral nanotubes that have been exfoliated from their as-synthesized state and have attached electroactive or photo active nanoscale particles or layers;
   c) at least two current collectors, each in contact with an electrode, or the electrode also functions as the current collector; and
   d) optionally an insulator.

2. An energy storage device comprising:
   a) at least two electrodes;
   b) at least one of the electrodes containing carbon or mineral nanotubes that have been exfoliated from their as-synthesized state and have attached electroactive or photoactive nanoscale particles or layers;
   c) at least two current collectors, each in contact with an electrode, or the electrode also functions as the current collector;
   d) an electrolyte disposed between said electrodes; and
   e) optionally a separator disposed in said electrolyte to provide electrical insulation between the electrodes while allowing ion flow within said electrolyte.

3. The energy storage or collection device of claim 1 wherein said electrodes or current collectors contain single walled carbon nanotubes.

4. The energy storage or collection device of claim 2 wherein said electrodes or current collectors contain single walled carbon nanotubes.

5. The energy storage or collection device of claim 3 or 4, wherein the single walled carbon nanotubes are primarily conducting.

6. The energy storage or collection device of claim 1 wherein said electrodes or current collectors contain nanotubes of length greater than about 0.2 micrometers.

7. The energy storage or collection device of claim 2 wherein said electrodes or current collectors contain nanotubes of length greater than about 0.2 micrometers.

8. The energy storage or collection device of claim 6 or 7, wherein the carbon nanotubes have a narrower distribution of lengths after exfoliation.

9. The energy storage or collection device of claim 1, wherein the nanotubes are more than 96 percent pure by weight.

10. The energy storage device of claim 2, wherein said electrodes or current collectors contain nanotubes which are substantially without the impurities present after initial synthesis.

11. The energy storage or collection device of claim 1 wherein at least one of the electrodes comprising nanotubes has been contacted with a surfactant that is also an electron transfer agent.

12. The energy storage or collection device of claim 2 wherein at least one of the electrodes comprising nanotubes has been contacted with a surfactant that is also an electrolyte or electron transfer agent.

13. The energy storage or collection device of claim 1 wherein the insulator further comprises a portion of nanotubes with attached nanoscale particles or layers distributed in an insulator medium such that the dielectric constant of the insulator and nanotube mixture is greater than the insulator medium.

14. The energy storage or collection device of claim 1 wherein the carbon or mineral nanotubes within the electrode or current collector are oriented.

15. The energy storage or collection device of claim 2 wherein the carbon or mineral within the electrode or current collector are oriented.

16. The energy storage or collection device of claim 1 wherein the nanotubes are admixed with conducting polymers.

17. The energy storage or collection device of claim 2 wherein the nanotubes are admixed with conducting polymers.

18. An energy storage or collection device comprising:
   a) at least two electrodes;
   b) at least one of the electrodes containing carbon or mineral nanotubes that have been exfoliated from their as-synthesized state and have attached electroactive or photoactive nanoscale particles or layers; and
   c) an electrolyte comprising a lithium salt and optionally an organic solvent.

19. An energy storage device of claim 18 wherein at least one electrode contains single walled carbon nanotubes, wherein a majority of the single walled carbon nanotubes are conducting.

20. The energy storage or collection device of claim 18, wherein at least one electrode contains nanotubes of length greater than 0.02 micrometers.

21. The energy storage or collection device of claim 20, wherein the nanotubes have a narrower distribution of lengths after exfoliation.

22. The energy storage device of claim 18 wherein the nanotubes are oriented.

23. The energy storage or collection device of claim 18 wherein the electrodes contain nanotubes which are substantially without the impurities present after initial synthesis.

24. A method for making an energy storage or collection device comprising:
   dispersing exfoliated nanotubes with attached nanoscale particles or layers in a medium to create an electrode; and
   joining the electrode with another media acting as a dielectric or electrolyte.

25. The method of claim 24, wherein the joining is performed using coextrusion through multilayer dies or multilayer generators.

26. The method of claim 24 wherein the electrode and the media are assembled by casting, spraying, paste spreading, compression, or stretching to give a desired form.

27. An energy storage or collection device that comprises exfoliated nanotubes with attached nanoscale particles and layers that provides increased strength and ruggedness to the device compared to devices without exfoliated nanotubes.

* * * * *